US010671169B2

(12) United States Patent
Park et al.

(10) Patent No.: US 10,671,169 B2
(45) Date of Patent: Jun. 2, 2020

(54) TACTILE FEEDBACK GENERATING APPARATUS AND SYSTEM FOR VIRTUAL OBJECT MANIPULATION

(71) Applicant: KOREA INSTITUTE OF SCIENCE AND TECHNOLOGY, Seoul (KR)

(72) Inventors: Jaeyoung Park, Seoul (KR); Bukun Son, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 0 days.

(21) Appl. No.: 16/177,789

(22) Filed: Nov. 1, 2018

(65) Prior Publication Data

US 2019/0391648 A1 Dec. 26, 2019

(30) Foreign Application Priority Data

Jun. 25, 2018 (KR) .......................... 10-2018-0072666

(51) Int. Cl.
*G06F 3/01* (2006.01)

(52) U.S. Cl.
CPC .............. *G06F 3/016* (2013.01); *G06F 3/014* (2013.01)

(58) Field of Classification Search
CPC .......... G06F 3/014; G06F 3/016; G06F 3/011; G06F 3/017; G06T 19/006; A63F 13/285; A63F 13/98; G08B 6/00; B25J 11/003
USPC ........................................... 340/407.1, 407.2
See application file for complete search history.

(56) References Cited

U.S. PATENT DOCUMENTS

| 6,042,555 A | * | 3/2000 | Kramer | ................... A61B 5/225 |
| | | | | 600/595 |
| 7,138,976 B1 | * | 11/2006 | Bouzit | ..................... G06F 3/014 |
| | | | | 345/156 |
| 9,104,271 B1 | * | 8/2015 | Adams | .................. G06F 3/0426 |
| 10,296,086 B2 | * | 5/2019 | Rimon | ..................... G06F 3/014 |
| 2016/0139666 A1 | * | 5/2016 | Rubin | ..................... B25J 11/003 |
| | | | | 345/633 |
| 2016/0259417 A1 | | 9/2016 | Gu | |
| 2017/0168565 A1 | * | 6/2017 | Cohen | ..................... B25J 13/025 |
| 2017/0220111 A1 | * | 8/2017 | Nakamura | .............. G06F 3/016 |

(Continued)

FOREIGN PATENT DOCUMENTS

KR         10-0934391 B1    12/2009
KR    10-2010-0010981 A    2/2010

(Continued)

OTHER PUBLICATIONS

CyberGlove Systems, "CyberGrasp"(http://www.cyberglovesystems.com/cybergrasp).

(Continued)

*Primary Examiner* — Eric Blount
(74) *Attorney, Agent, or Firm* — Rabin & Berdo, P.C.

(57) ABSTRACT

A tactile feedback generating apparatus, which applies a tactile feedback to a hand of a user according to an interaction with a virtual object in a virtual space, includes a finger tactile feedback device configured to provide a tactile feedback to a finger, and a palm tactile feedback device configured to provide a pressurized tactile feedback to a palm, wherein the palm tactile feedback device includes at least one pressurizing module disposed at the palm, and wherein the at least one pressurizing module converts a rotational operation into a linear movement to pressurize or release the palm.

8 Claims, 9 Drawing Sheets

(56) References Cited

U.S. PATENT DOCUMENTS

2017/0300115 A1* 10/2017 Kerr .................. G06F 3/016
2018/0280227 A1* 10/2018 Quest ................ A61H 9/0078
2018/0335842 A1* 11/2018 Rubin ................ G06F 3/014

FOREIGN PATENT DOCUMENTS

| KR | 10-1486400 B1 | 1/2015 |
| KR | 10-1643576 B1 | 7/2016 |
| KR | 10-1789696 B1 | 10/2017 |
| KR | 10-1826911 B1 | 2/2018 |
| WO | WO 2012/096666 A1 | 7/2012 |
| WO | WO 2017/042135 A1 | 3/2017 |

OTHER PUBLICATIONS

Kouta Minamizawa et al., "A Palm-Worn Haptic Display for Bimanual Operations in Virtual Environments", EuroHaptics, 2008, pp. 458-463.

* cited by examiner

TACTILE FEEDBACK GENERATING APPARATUS AND SYSTEM FOR VIRTUAL OBJECT MANIPULATION

CROSS-REFERENCE TO RELATED APPLICATION

This application claims priority to Korean Patent Application No. 10-2018-0072666, filed on Jun. 25, 2018, and all the benefits accruing therefrom under 35 U.S.C. § 119, the contents of which in its entirety are herein incorporated by reference.

BACKGROUND

1. Field

The present disclosure relates to a tactile feedback generating apparatus for virtual object manipulation and a system including the same, and more particularly, to an apparatus and system for generating a tactile feedback and providing the tactile feedback not only to the finger but also to the palm for virtual object manipulation.

2. Description of the Related Art

A device for transmitting a tactile feedback according to the contact with a virtual object is being actively studied. If a hand is moved in the real space, the position of the hand is sensed through a sensor, and the sensed position is reflected to the position in the virtual space, so that the hand of the real space may interact with the virtual object.

A variety of devices that may be switched to mechanical touch or non-touch disposition upon contact or non-contact with a virtual object to be touched during interaction with the virtual object have been developed.

Conventional tactile feedback devices are mostly a wearable device that provides reverse feedback or tactile feedback to the finger, and the tactile feedback may be transmitted to the finger according to the interaction with a virtual object. However, in order to more realistically transmit the interaction with the virtual object in the virtual environment, it is necessary to provide the tactile feedback not only to the finger but also to the palm. The virtual object may touch the palm as well as the finger, and in this case, the realism in the virtual environment may be enhanced as a whole when the tactile feedback is transmitted to the palm.

RELATED LITERATURES

Patent Literature (Patent Literature 1) US Patent Application Publication No. 2016/0259417 A1

SUMMARY

The present disclosure is to solve the problem of the tactile feedback device described above, and the present disclosure is directed to providing a tactile feedback generating apparatus, which may finely control the tactile feedback to the finger and the palm when interacting with a virtual object, and a tactile feedback generating system including the tactile feedback generating apparatus.

The object of the present disclosure is not limited to the above, and other objects not mentioned herein will be clearly understood by those skilled in the art from the following description.

In one aspect, there is provided a tactile feedback generating apparatus, which applies a tactile feedback to a hand of a user according to an interaction with a virtual object in a virtual space, the tactile feedback generating apparatus comprising: a finger tactile feedback device configured to provide a tactile feedback to the finger; and a palm tactile feedback device configured to provide a pressurized tactile feedback to the palm, wherein the palm tactile feedback device includes at least one pressurizing module disposed at the palm, and wherein the at least one pressurizing module converts a rotational operation into a linear movement to pressurize or release the palm.

According to an embodiment of the present disclosure, each of the at least one pressurizing module may include: a first link; a second link connected to the first link to linearly move in proportion to a rotation angle of the first link when the first link performs a rotational operation; and a plate connected to the second link to linearly move in proportion to a linear moving distance of the second link.

According to an embodiment of the present disclosure, the rotation angle of the first link may be calculated according to contact intensity determined based on positions of the virtual object and the palm of a virtual hand model in the virtual space and the linear moving distance of the second link.

According to an embodiment of the present disclosure, the finger tactile feedback device may include at least one sensor, and the virtual hand model may be configured in the virtual space based on posture, position and direction information of the hand, measured by the at least one sensor.

According to an embodiment of the present disclosure, each of the at least one pressurizing module may be fixed to the palm by a fixing unit made of an elastic material.

According to an embodiment of the present disclosure, the finger tactile feedback device may include a plurality of holders at which the finger is hung and fixed.

In another aspect of the present disclosure, there is also provided a tactile feedback generating system, which applies a tactile feedback to a hand of a user according to an interaction with a virtual object in a virtual space, the tactile feedback generating system comprising: a tactile feedback generating apparatus described above; and a control device configured to control the tactile feedback generating apparatus, wherein the control device collects posture, position and direction information of the hand from at least one sensor included in the finger tactile feedback device, and controls the tactile feedback generating apparatus based on collision detection of the virtual object and the hand of the user by using the collected information.

According to an embodiment of the present disclosure, the control device may calculate a tactile feedback value based on a contact region between a virtual hand model and the virtual object in the virtual space, transmit the calculated tactile feedback value to the finger tactile feedback device to adjust a joint angle of the finger tactile feedback device, and transmit the calculated tactile feedback value to the palm tactile feedback device to adjust a pressurization degree of the palm tactile feedback device.

The tactile feedback generating apparatus according to various embodiments of the present disclosure may provide tactile feedback stimulation to the palm as well as the finger. In addition, it is possible to provide relatively large stimulation by using a pressurized palm stimulation module, and it is possible to provide step-wise and continuous palm tactile feedback. Moreover, the palm tactile feedback device according to various embodiments of the present disclosure may be implemented in a simple and small design and may be placed through anatomical considerations, thus making it possible to move smoothly with less restrictions on movement. The present disclosure may be utilized for VR/AR, 4D entertainment systems, games, small/pocket interfaces, wearable equipment, related researches and the like.

The effects obtainable from the present disclosure are not limited to the effects mentioned above, and other effects not mentioned herein will be clearly understood by those skilled in the art from the following description.

DETAILED DESCRIPTION

Hereinafter, a tactile feedback generating apparatus and system according to an embodiment of the present disclosure will be described with reference to the accompanying drawings. Even though the present disclosure is with reference to the embodiment shown in the drawings, this is just an embodiment, and the technical features of the present disclosure and its essential configuration and operation are not limited thereto.

Figure 1:
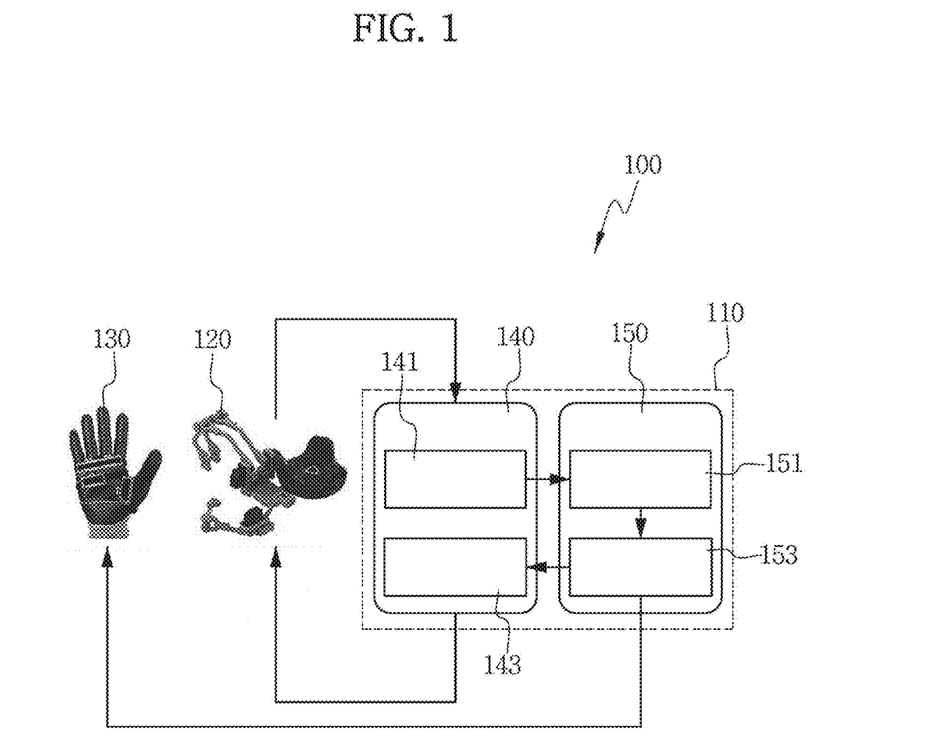
FIG. 1 is a schematic view showing a tactile feedback generating system according to an embodiment of the present disclosure.

FIG. 1 is a schematic view showing a tactile feedback generating system 100 according to an embodiment of the present disclosure. Referring to FIG. 1, the tactile feedback generating system 100 according to an embodiment of the present disclosure includes a control device 110, a finger tactile feedback device 120, and a palm tactile feedback device 130.

The control device 110 may include a data acquisition and tracking unit 140 and a haptic rendering unit 150. For example, the control device 110 may include at least one processor, and operations of the data acquisition and tracking unit 140 and the haptic rendering unit 150 may be controlled by the at least one processor.

According to an embodiment of the present disclosure, an update module 141 of the data acquisition and tracking unit 140 receives information such as a position, a direction and a joint angle of the finger from at least one sensor (e.g., a motion tracking sensor) provided at the finger tactile feedback device 120, and updates the virtual hand position/shape in the virtual space. A collision detection module 151 of the haptic rendering unit 150 detects a contact or a collision with a virtual object based on the updated virtual hand position/ shape information, and a calculation module 153 calculates a tactile feedback stimulation based on a contact position, a contact area or the like when the contact is detected. The calculated tactile feedback stimulus is transmitted to the palm tactile feedback device 130, or is PWM (pulse with modulation)-converted through a conversion module 143 and then transmitted to the finger tactile feedback device 120. Each device is driven according to the calculated tactile feedback stimulus to give a finger tactile feedback and a palm tactile feedback.

Figure 2:
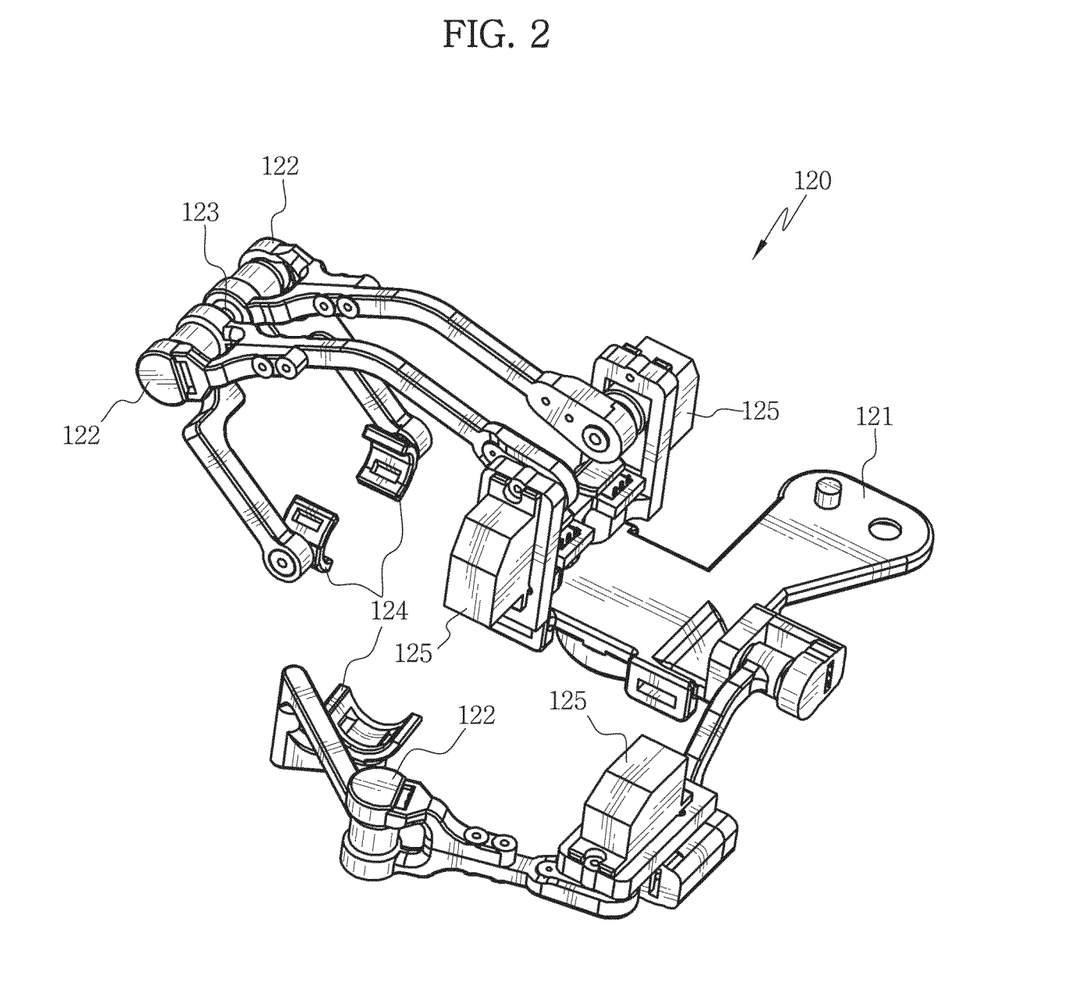
FIG. 2 is a perspective view showing a finger tactile feedback device according to an embodiment of the present disclosure.

FIG. 2 is a perspective view showing the finger tactile feedback device 120 according to an embodiment of the present disclosure. Referring to FIG. 2, the finger tactile feedback device 120 according to an embodiment of the present disclosure includes a base 121, a connector 122, a holder 124, and a driver 125.

The base 121 may be connected to a finger fixing unit with a joint structure including a finger holder 124 into which a finger is inserted. At least one sensor, for example a motion tracking sensor (e.g., a VIVE tracker), may be fixed on base 121. The at least one sensor allows measurement of the position and posture of the hand and the finger. The finger fixing unit with a joint structure includes a finger holder 124 and a connector 122 connecting the structure connected to the base 121. The connector 122 may be a rotatable joint structure that includes a potentiometer for adjusting the amount or magnitude of the electrical output signal through a mechanical position change and a bearing 123 for securing the rotary shaft.

As shown in FIG. 2, the finger fixing unit with a joint structure may include a driver 125 which is a power source for mechanically driving the control signal. For example, driver 125 may be a servomotor. The finger tactile feedback device 120 may include at least one finger fixing unit with a joint structure for providing a tactile feedback by handing the finger, and for example, referring to FIG. 2, may include a plurality of finger fixing units with a joint structure, including a thumb finger fixing unit. According to an embodiment of the present disclosure, the base 121 is a portion that contacts the back portion of the hand, and a tip portion of the base 121 may be connected to centers of interphalangeal (DIP) joints and proximal interphalangeal (PIP) joints of the thumb, the index finger and the middle finger, respectively.

Figure 3A:
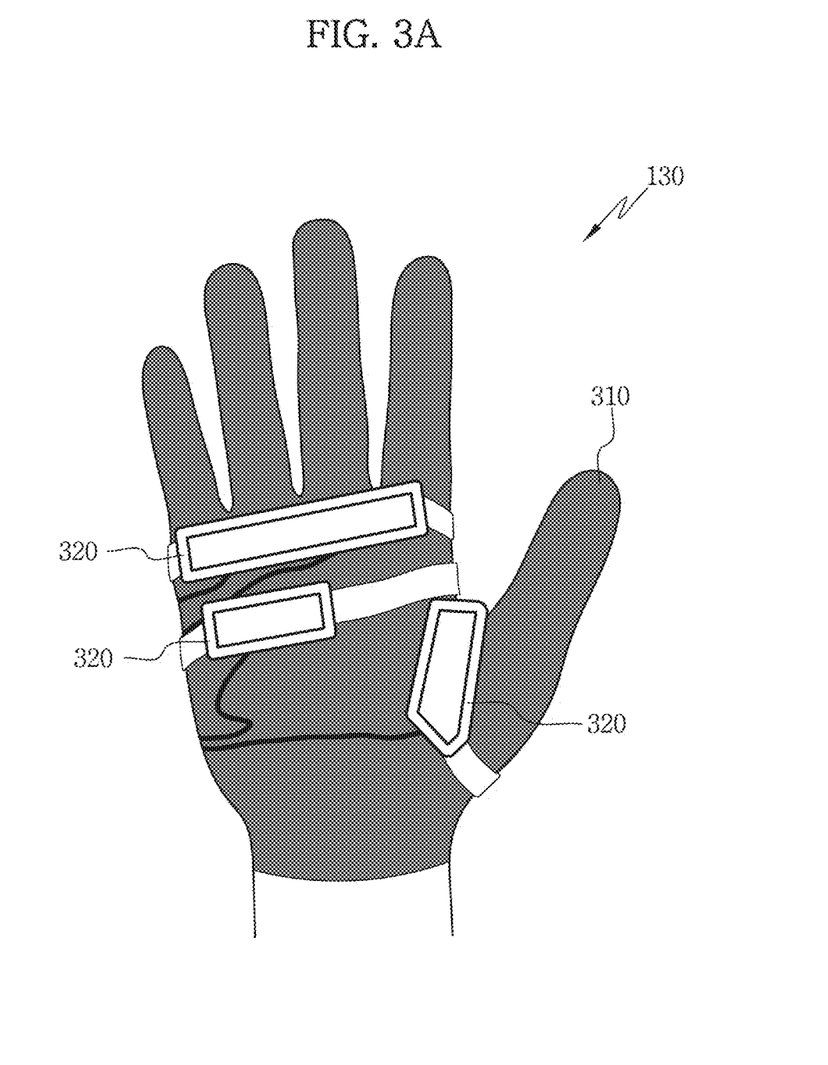
FIGS. 3A and 3B show a pressurized palm tactile feedback device according to an embodiment of the present disclosure.
Figure 3B:
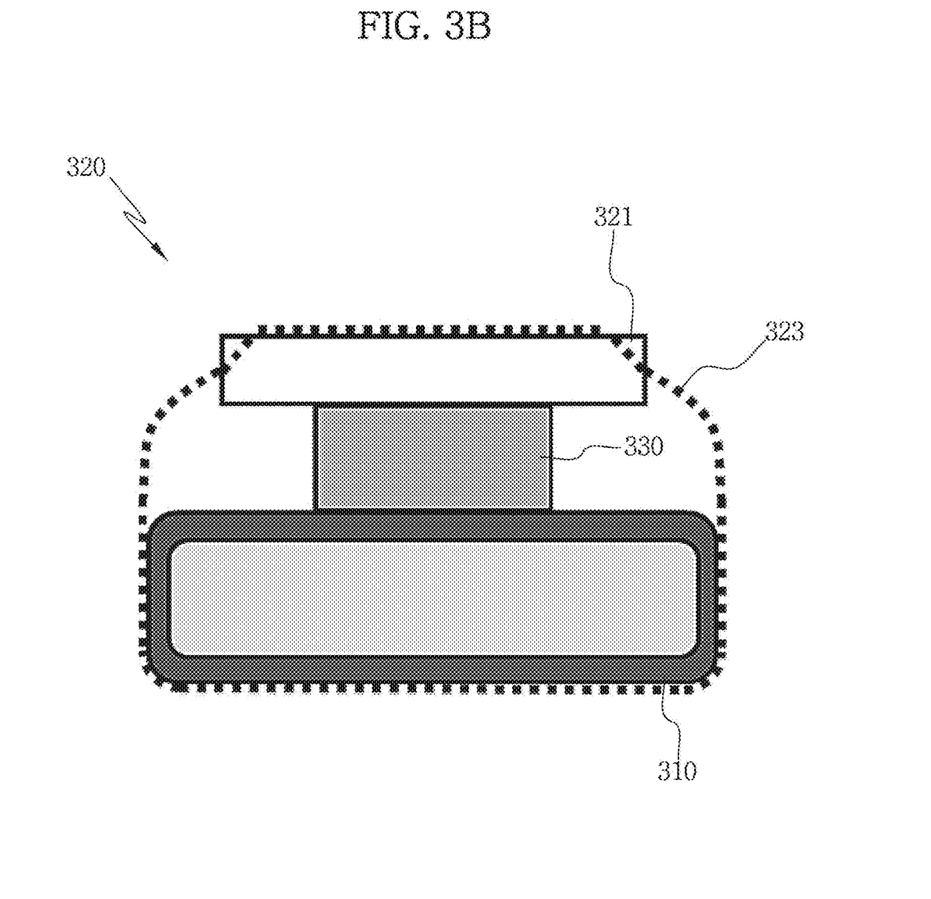

FIGS. 3A and 3B show the pressurized palm tactile feedback device 130 according to an embodiment of the present disclosure. FIG. 3A shows an example of wearing the pressurized palm tactile feedback device 130, and FIG. 3B is a cross-sectional view showing a stimulation generating unit 320 of the pressurized palm tactile feedback device 130.

Figure 5:
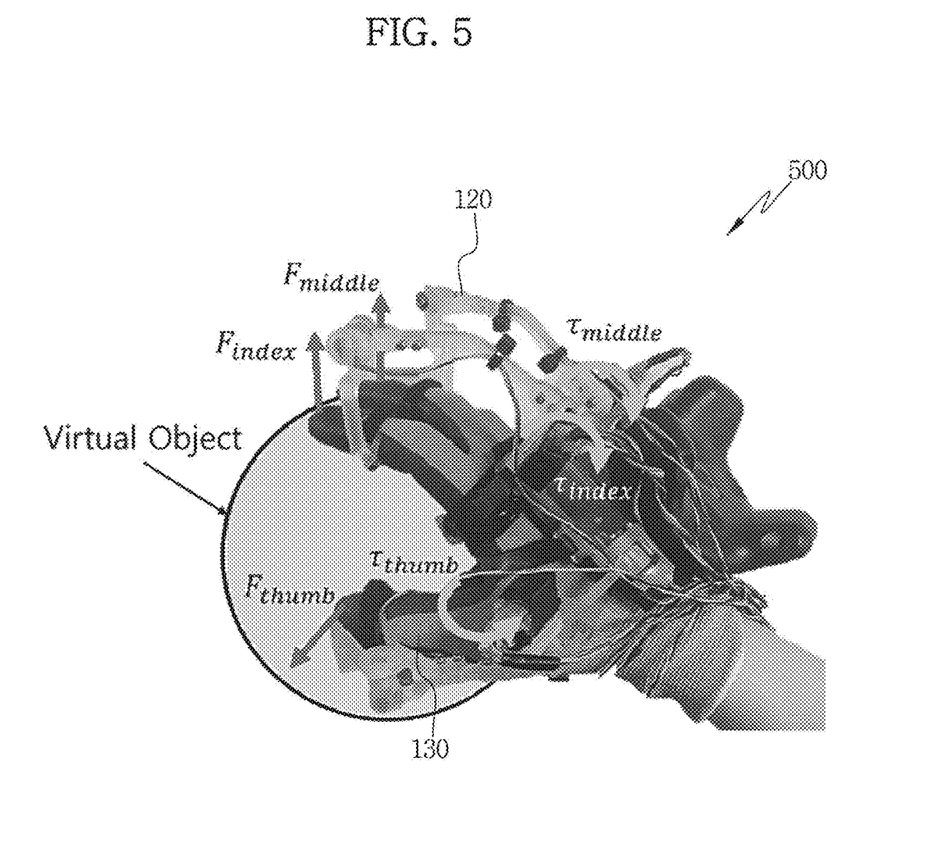
FIG. 5 shows an example of pressurized stimulation generated by a virtual object when the tactile feedback generating apparatus according to an embodiment of the present disclosure is worn.

Referring to FIG. 3A, the palm tactile feedback device 130 includes a glove 310 and an at least one stimulation generating unit 320 disposed on the glove 310. Although the shape and the number of stimulation generating units 320 may be variously changed, for example, when a virtual object is held by a hand as shown in FIG. 5, the stimulation generating units 320 may be disposed at three regions as shown in FIG. 3A, namely a muscle region connected to the thumb, a muscle region connected to the remaining four fingers and a muscle region under the little finger, in order to transmit a contact stimulation of the virtual object to the palm.

Referring to FIG. 3B, the stimulation generating unit 320 includes a cover plate 321 and a pressurizing module 330. The stimulation generating unit 320 may be arranged such that the pressurizing module 330 comes into contact on the glove 310 worn on the hand and the cover plate 321 is stacked thereon. In some cases, the cover plate 321 may be omitted. The stimulation generating unit 320 where the glove 310 worn on the hand, the pressurizing module 330 and the cover plate 321 are disposed in order is fixed using a fixing unit 323. The fixing unit 323 may be made of an elastic material such as a rubber band.

Figure 4A:
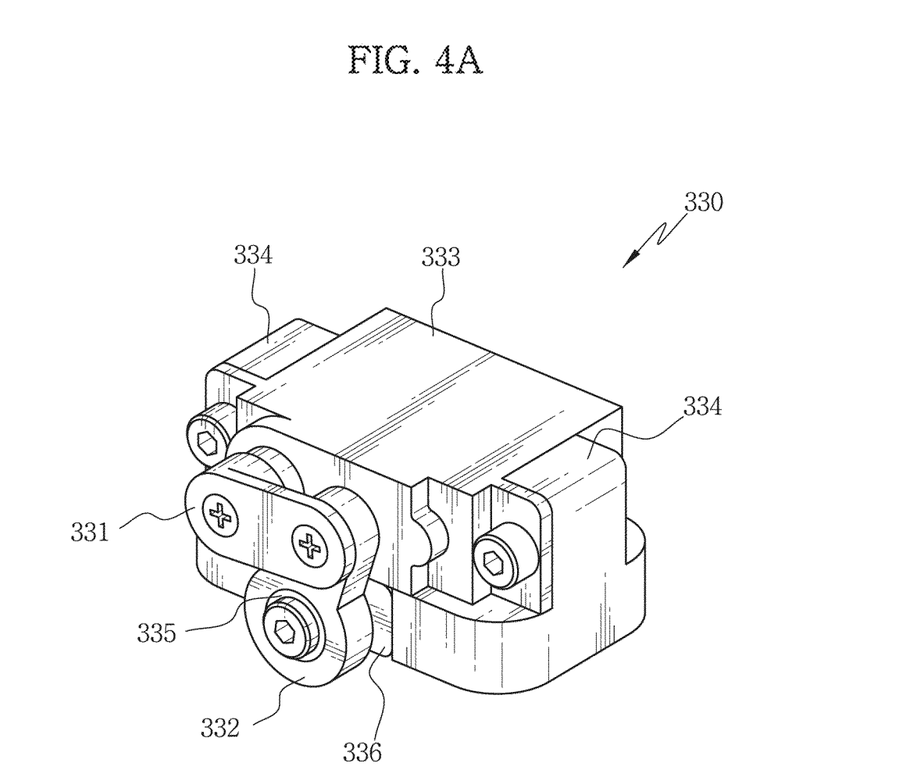
FIGS. 4A to 4C show a pressurizing module of the pressurized stimulation generating unit according to an embodiment of the present disclosure.
Figure 4B:
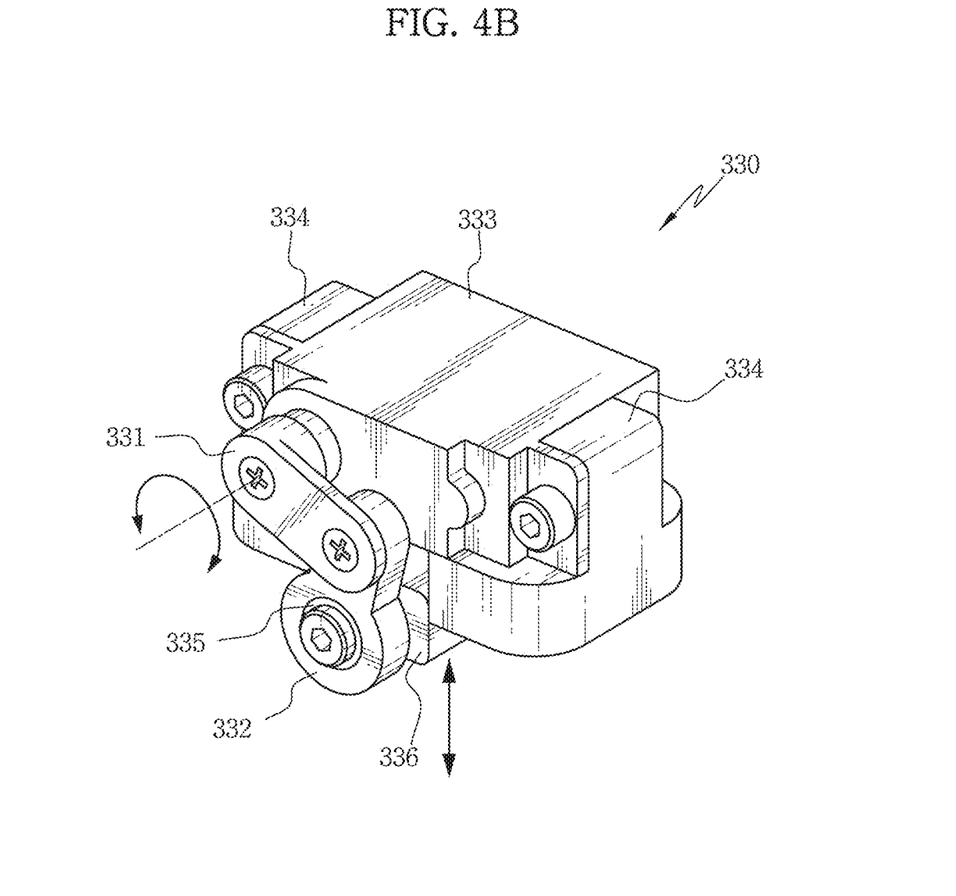
Figure 4C:
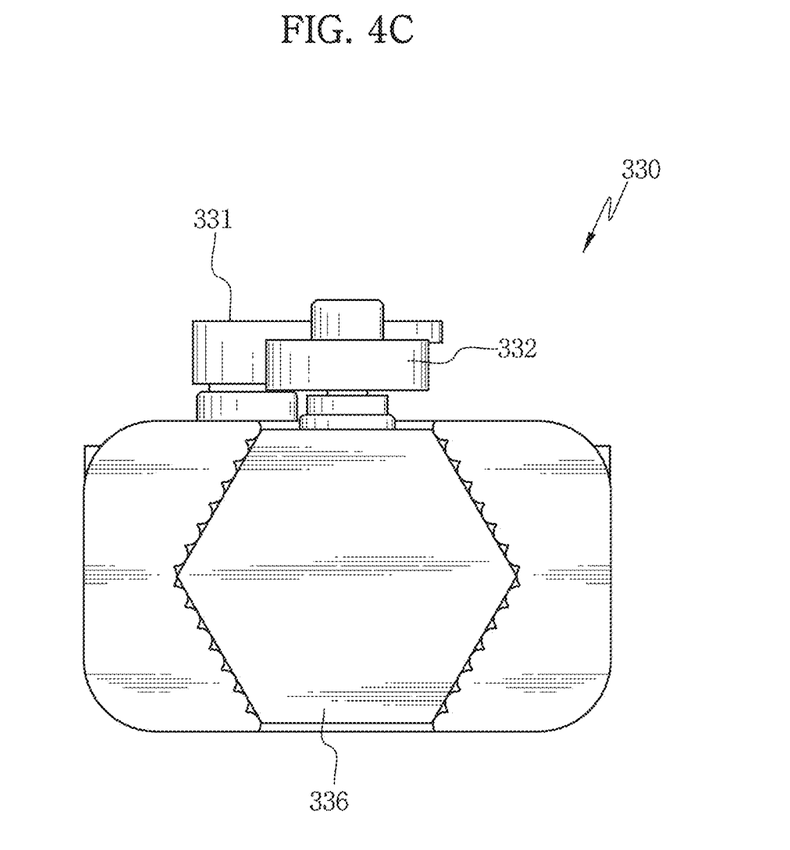

FIGS. 4A to 4C show the pressurizing module 330 of the pressurized stimulation generating unit 320 according to an embodiment of the present disclosure. FIGS. 4A to 4C are respectively a perspective view, a driving view and a bottom view showing the pressurizing module 330 according to an embodiment of the present disclosure.

Referring to FIGS. 4A to 4C, the pressurizing module 330 includes a first link 331, a second link 332, a driver 333, a base 334 and a moving plate 336.

As shown in FIG. 4A, the first link 331 is connected to the second link 332. The first link 331 is rotated by the force transmitted from the driver 333, and the second link 332 connected to the first link 331 linearly moves upward/downward in accordance with the counterclockwise/clockwise rotation of the first link 331. The connector to which the first link 331 and the second link 332 are connected may further include a bearing 335 for supporting the rotary shaft.

As shown in FIGS. 4B and 4C, if the second link 332 linearly moves in the up/down direction, the moving plate 336 connected to the second link 332 also linearly moves upward/downward. As the moving plate 336 having a broad plate shape moves, the palm portion where the stimulation generating unit 320 is fixed may receive a pressured tactile feedback, or the stimulation may weaken or disappear. The contact area may be calculated by comparing the position of the virtual object and the palm in the virtual space, and the rotation angle of the first link 331 and the resultant movement distance of the second link 332 may be calculated according to the contact intensity determined accordingly. Also, the pressurization degree may be adjusted by moving the moving plate 336 step by step. The moving distance of the second link 332 may be proportional to the rotation angle of the first link 331, and the moving distance of the moving plate 336 may be proportional to the moving distance of the second link 332. This relationship allows the user to control the degree of pressurized tactile feedback, felt through the palm.

FIG. 4C shows the moving plate 336 with a hexagonal shape, but this is just an example and its shape is not limited thereto. The size and shape of the moving plate 336 may be determined based on at least one factor among the type of stimulation to be expressed, the intensity of stimulation and the number of the stimulation generating units 320. As shown in FIG. 4C, the moving plate 336 may be disposed between the bases 334 at both sides. An end of the base 334 in contact with the moving plate 336 may have a rough surface. As shown in FIG. 4A, the base 334 may be exposed in a direction opposite to the bottom surface to support the driver 333 at both ends.

FIG. 5 shows an example of generating a pressurized stimulation to a virtual object when the tactile feedback generating apparatus 500 according to an embodiment of the present disclosure is worn.

Referring to FIG. 5, the tactile feedback generating apparatus 500 includes a finger tactile feedback device 120 and a palm tactile feedback device 130. For example, in a state where a virtual object is in contact with a palm as well as a finger, like holding the virtual object by the entire hand, the contact to the virtual object and its intensity may be realistically controlled by applying a tactile feedback to each finger in a direction perpendicular to the tangent of the spherical virtual object. In other words, an interaction in the virtual space may be transmitted as a tactile feedback in the real space by pressurizing the finger and the palm of the user by using the tactile feedback generating apparatus 500 according to an embodiment of the present disclosure based on the virtual interaction between the virtual object and the hand model. At this time, as shown in FIG. 5, the finger tactile feedback device 120 may generate ad provide a tactile feedback by adjusting a joint angle of the connector so that the finger holder 124 pulls the finger in the feedback direction. The palm tactile feedback device 130 may generate and provide a tactile feedback through pressurized contact of the plate 336 to the palm portion by controlling at least one pressurizing module 330 disposed at the palm, respectively.

Figure 6A:
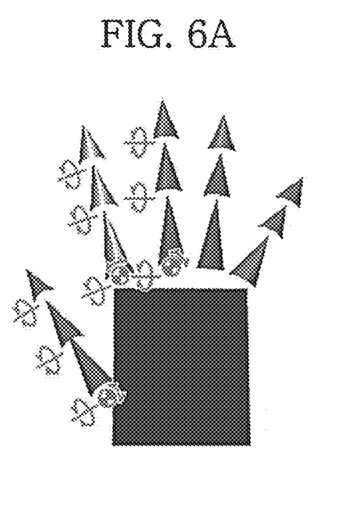
FIGS. 6A to 6C illustrate a method for measuring finger and palm stimulation according to an embodiment of the present disclosure.
Figure 6B:
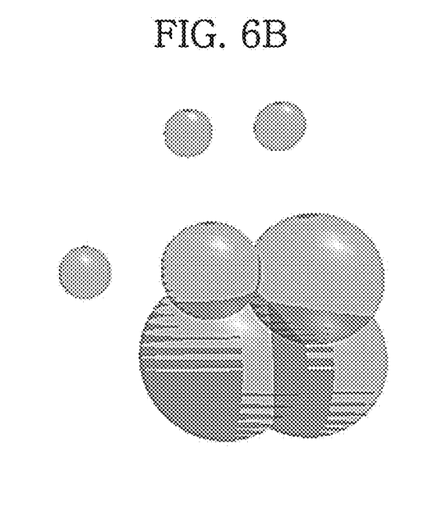
Figure 6C:
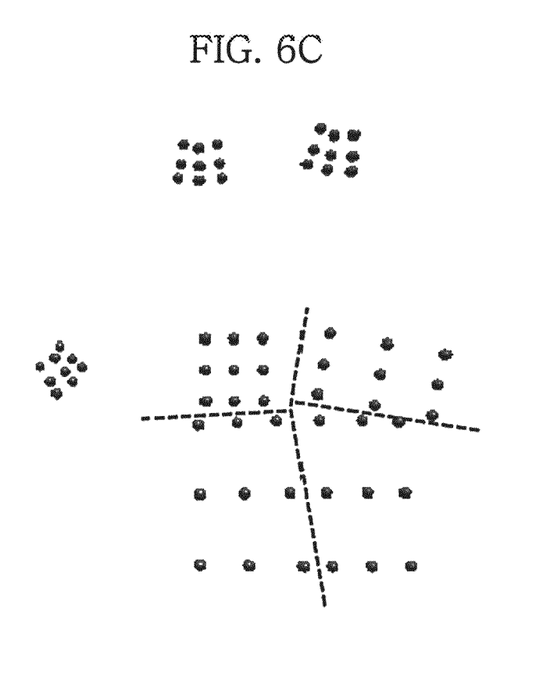

When a virtual hand model is constructed in the virtual space, the virtual hand model is constructed as shown in FIGS. 6A to 6C based on the information of the posture, position and direction of the hand tracked by at least one sensor (e.g., a VIVE tracker) of the finger tactile feedback device 120. For example, as shown in FIG. 1, the control device 110 receives information such as positions, directions and joint angles of the fingers, namely the thumb, the index finger and the middle finger, from the motion tracking sensor provided at the finger tactile feedback device 120, and the rotation axes of these fingers are shown as in FIG. 6A. The positions of the DIP and PIP joints may be calculated based on the information received from the motion tracking sensor.

In virtual space, the collision between the virtual object and the hand model may be detected by the control device 110 through broad-phase and narrow-phase. According to an embodiment of the present disclosure, for the broad-phase collision detection, bounding spheres may be located at three fingertips and four palm portions as shown in FIG. 6B. As shown in FIG. 6C, nine contact points may be located within each bounding sphere. For example, if there is a contact between the bounding sphere and the virtual object, the narrow-phase collision detection is performed. Then, as shown in FIG. 6B, the contact between the contact point located within the bounding sphere and the virtual object is checked. For example, as shown in FIG. 6B, three contacts may be checked by three arrays. The density of the array (e.g., the interval between contact points in the bounding sphere) may be determined relatively rarely, in consideration of the wide contact area covered by each driver.

The tactile feedback may be calculated in consideration of the number and position of contacts with the contact points, and the calculated tactile feedback value may be converted and transmitted to the finger tactile feedback device 120 or the palm tactile feedback device 130 as shown in FIG. 1. By means of the tactile feedback value, the finger tactile feedback device 120 may provide a tactile feedback to the finger by adjusting the joint angle, and the palm tactile feedback device 130 may adjust the rotation angle of the first link 331 of each pressurizing module 330 to control a linear moving distance of the second link 332, and accordingly adjust the moving distance of the moving plate 336, which moves linearly, to control the position and intensity of the pressurized tactile feedback.

The arrangement of the bounding spheres and the contact points depicted in FIGS. 6B and 6C may be variously modified in consideration of the shape of the virtual object and the sensitivity of the stimulation, and the arrangement and the number of the stimulation generating unit 320 at the palm tactile feedback device 130 may be determined according to the arrangement of the bounding spheres and the contact points.

According to the present disclosure described above, a contact stimulation with a virtual object may be provided not only to the finger but also to the palm, and it is possible to control the change and intensity of the tactile feedback according to the deformation of the skin surface by adjusting the intensity thereof. In the embodiments described above, components included in the invention have been expressed in a singular or plural form in accordance with the specific embodiments proposed herein. However, the singular or plural expression is selected appropriately for the sake of convenience of description, and the embodiments described above are not limited to the singular or plural expression. A component expressed in a plural form may be provided singularly, and a component expressed in a singular form may also be provided in plural.

Meanwhile, even though the specific embodiments have been explained in the present disclosure, the embodiments can be modified in various ways without departing from the scope of the present disclosure. Therefore, the scope of the present disclosure should not be construed as limited to the embodiments described herein but should be determined by the appended claims and their equivalents.

REFERENCE SIGNS

| | |
|---|---|
| 100: tactile feedback generating system | 110: control device |
| 120: finger tactile feedback device | 121, 334: base |
| 122: connector | 123, 335: bearing |
| 124: holder | 125, 333: driver |
| 130: palm tactile feedback device | 310: glove |
| 320: stimulation generating unit | 321: cover plate |
| 323: fixing unit | 330: pressurizing module |
| 331: first link | 332: second link |
| 336: moving plate | 500: tactile feedback generating apparatus |

What is claimed is:

1. A tactile feedback generating apparatus, which applies a tactile feedback to a hand of a user according to an interaction with a virtual object in a virtual space, the tactile feedback generating apparatus comprising:
   a finger tactile feedback device configured to provide a tactile feedback to a finger; and
   a palm tactile feedback device configured to provide a pressurized tactile feedback to a palm,
   wherein the palm tactile feedback device includes at least one pressurizing module disposed at the palm, the at least one pressurizing module comprising a rotatable linking member and a plate connected to the rotatable linking member, and
   wherein the at least one pressurizing module converts a rotational operation of the rotatable linking member into a linear movement of the plate to apply pressure to the palm or reduce pressure to the palm.

2. The tactile feedback generating apparatus according to claim 1, wherein the rotatable linking member includes:
   a first link; and
   a second link connected to the first link to linearly move in proportion to a rotation angle of the first link when the first link performs a rotational operation, and
   wherein the plate is connected to the second link to linearly move in proportion to a linear moving distance of the second link.

3. The tactile feedback generating apparatus according to claim 2, wherein the rotation angle of the first link is calculated according to contact intensity determined based on positions of the virtual object and a palm of a virtual hand model in the virtual space and the linear moving distance of the second link.

4. The tactile feedback generating apparatus according to claim 3, wherein the finger tactile feedback device includes at least one sensor, and
   wherein the virtual hand model is configured in the virtual space based on posture, position and direction information of the hand, measured by the at least one sensor.

5. The tactile feedback generating apparatus according to claim 1, wherein each of the at least one pressurizing module is fixed to the palm by a fixing unit made of an elastic material.

6. The tactile feedback generating apparatus according to claim 1, wherein the finger tactile feedback device includes a plurality of holders at which the finger is hung and fixed.

7. A tactile feedback generating system, which applies a tactile feedback to a hand of a user according to an interaction with a virtual object in a virtual space, the tactile feedback generating system comprising:
   the tactile feedback generating apparatus; and
   a control device configured to control the tactile feedback generating apparatus,
   wherein the tactile feedback generating apparatus comprises:
      a finger tactile feedback device configured to provide a tactile feedback to a finger; and
      a palm tactile feedback device configured to provide a pressurized tactile feedback to a palm,
   wherein the palm tactile feedback device includes at least one pressurizing module disposed at the palm,
   wherein the at least one pressurizing module converts a rotational operation into a linear movement to apply pressure to the palm, or reduce pressure to the palm, and
   wherein the control device collects posture, position and direction information of the hand from at least one sensor included in the finger tactile feedback device, and controls the tactile feedback generating apparatus based on collision detection of the virtual object and the hand of the user by using the collected information.

8. The tactile feedback generating system according to claim 7, wherein the control device calculates a tactile feedback value based on a contact region between a virtual hand model and the virtual object in the virtual space, transmits the calculated tactile feedback value to the finger tactile feedback device to adjust a joint angle of the finger tactile feedback device, and transmits the calculated tactile feedback value to the palm tactile feedback device to adjust a pressurization degree of the palm tactile feedback device.

* * * * *